United States Patent [19]

Seike et al.

[11] Patent Number: 4,796,149
[45] Date of Patent: Jan. 3, 1989

[54] LIGHTNING ARRESTOR INSULATOR

[75] Inventors: Shoji Seike; Takao Totoki, both of Nagoya; Masayuki Nozaki, Aichi, all of Japan

[73] Assignee: NGK Insulators, Ltd., Nagoya, Japan

[21] Appl. No.: 54,789

[22] Filed: May 27, 1987

[30] Foreign Application Priority Data

Nov. 27, 1986 [JP] Japan ................. 61-282822

[51] Int. Cl.[4] ............................................. H02H 3/22
[52] U.S. Cl. ...................... 361/117; 361/127
[58] Field of Search ................. 361/117–127, 361/132, 111; 338/4, 21, 25

[56] References Cited

U.S. PATENT DOCUMENTS

| | | | |
|---|---|---|---|
| 2,852,352 | 5/1956 | Landron, Jr. | 156/657 |
| 3,959,543 | 5/1976 | Ellis | 361/126 X |
| 4,223,366 | 9/1980 | Sweetang, Jr. et al. | 361/127 |
| 4,319,215 | 3/1982 | Yamazaki et al. | 338/21 |
| 4,335,417 | 6/1982 | Sakshaug et al. | 338/21 X |
| 4,404,614 | 9/1983 | Koch et al. | 361/126 X |
| 4,463,405 | 7/1984 | Koch et al. | 361/127 X |
| 4,571,660 | 2/1986 | Mitsumatsu et al. | 361/127 |
| 4,686,603 | 2/1987 | Mosele | 361/127 X |

FOREIGN PATENT DOCUMENTS 0103454 3/1984 European Pat. Off. .

OTHER PUBLICATIONS

Chemical Abstracts, vol. 105, No. 10, Sep. 8, 1986.

*Primary Examiner*—A. D. Pellinen
*Assistant Examiner*—A. Jonathan Wysocki
*Attorney, Agent, or Firm*—Parkhurst, Oliff & Berridge

[57] ABSTRACT

In a lightning arrestor insulator wherein a ZnO element having voltage non-linear resistant characteristics is embedded in an insulator body and integrally fixed with a glassy bonding material, the glassy bonding material has a thermal expansion coefficient smaller than either of those of the ZnO element and the insulator body. As the glassy bonding material, a low melting $PbO\text{-}B_2O_3$ system glass having a composition to separate, during solidification, low expanding ceramic crystals is preferably employed.

15 Claims, 4 Drawing Sheets

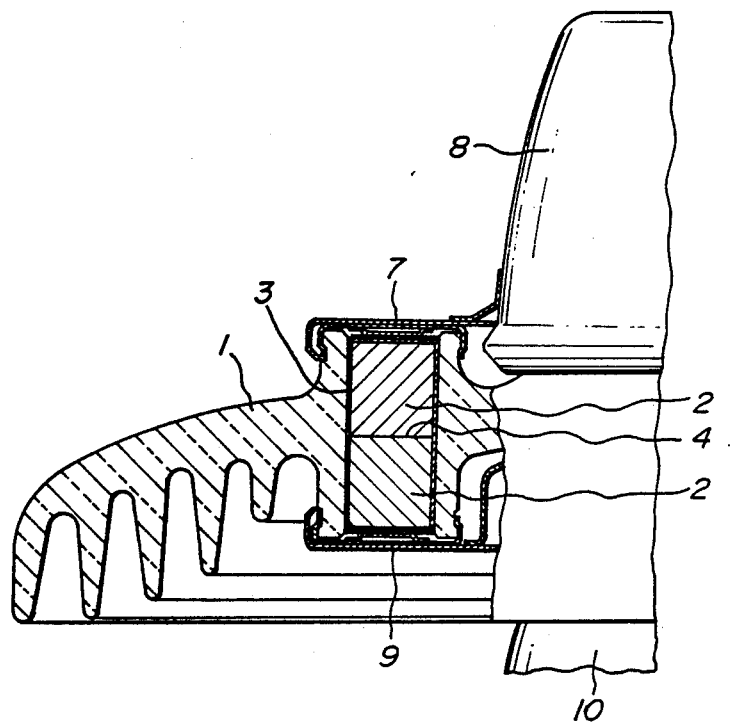
FIG_2

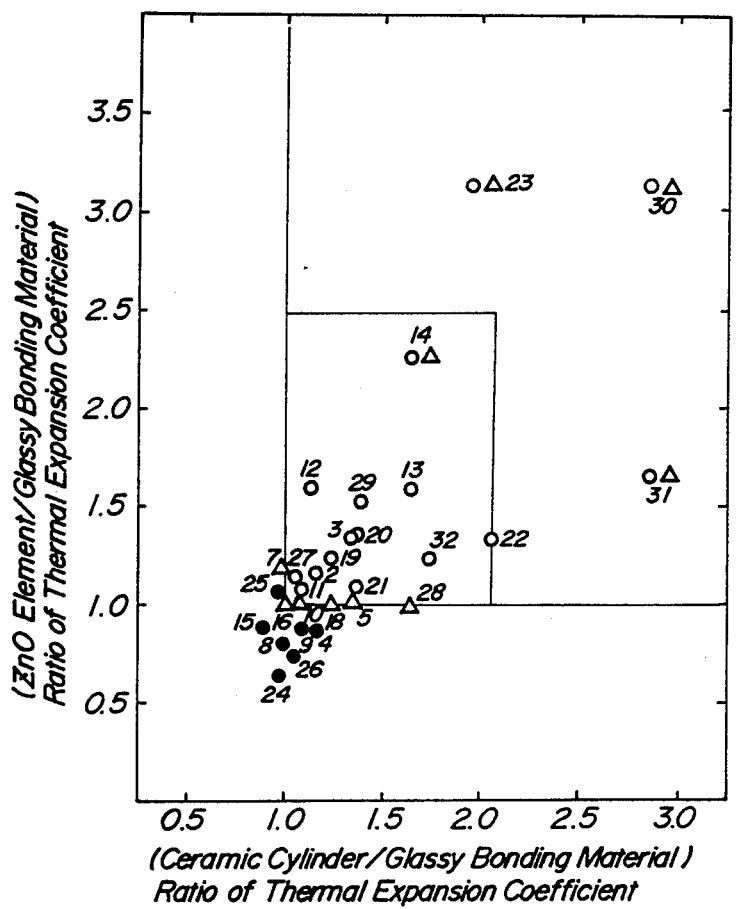

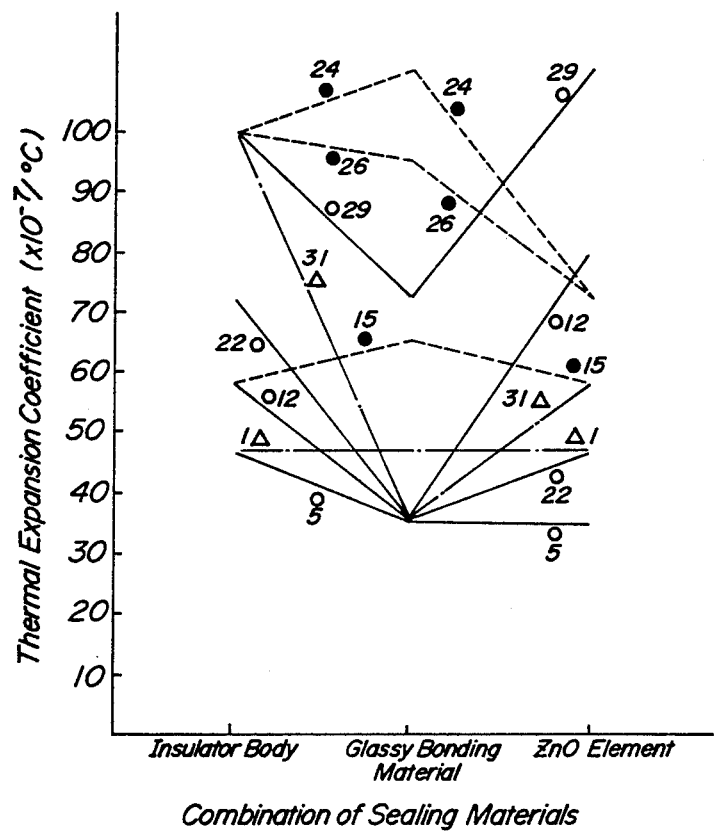
FIG_4

LIGHTNING ARRESTOR INSULATOR

BACKGROUND OF THE INVENTION

1. Field of the Invention

The present invention relates to a lightning arrestor insulator wherein ZnO elements are embedded and integrally fixed inside the insulator body.

2. Description of the Prior Art

As a means to protect an insulator itself from overcurrent in the case of the striking of a thunderbolt, attention has been drawn to a lightning arrestor insulator, such as shown in Gazettes of Japanese Patent Application Laid-open Nos. 124,294/1979, 32,308/1980, 49,178/1984, etc., wherein an element comprising ZnO as a main component having voltage non-linear resistant characteristics (hereinafter referred to as ZnO element) is embedded in the insulator and integrally fixed with an inorganic bonding material such as cement, glass or the like. Such a ZnO element reacts with moisture in air and gradually reduces its resistance value, with increasing heat generation, whereby the insulator is put in danger of fracture, so that it is usually fixed inside the insulator, with its periphery sealed hermetically so as to prevent from deterioration.

In such a case, for the purpose of avoiding the deterioration by heat of the ZnO element during the sealing, a low melting glass which enables the sealing at low temperatures has been heretofore selected as the inorganic bonding material, without giving any particular consideration to the thermal expansion coefficient of the inorganic bonding material, and so upon a rapid cooling during heat treatment in the manufacturing step or when the lightning arrestor insulator whose temperature has been elevated by applied voltage is subjected to rain, snow or the like, or upon a rapid heating due to a striking thunderbolt, a large thermal stress is formed in the lightning arrestor insulator and cracks initiate on the interface between the inorganic bonding material and the insulator, ZnO element, etc. and, according to circumstances, there have existed possibilities to induce a serious accident such as fracture of the insulator.

SUMMARY OF THE INVENTION

The present invention has been accomplished, aiming to solve the existing problems as mentioned above and directed to a lightning arrestor insulator which is able to minimize to the utmost the rate of internal crack initiation in the case where the lightning arrestor insulator is subjected to a rapid cooling or heating during its manufacture or use.

The present invention, accomplished as a result of many experiments and actual service tests conducted to solve the aforementioned technical problems, is a lightning arrestor insulator wherein a ZnO element having voltage non-linear resistant characteristics is embedded in an insulator body and integrally fixed with a glassy bonding material, which is characterized in that said glassy bonding material has a thermal expansion coefficient smaller than either of thermal expansion coefficients of the ZnO element and the insulator body.

BRIEF DESCRIPTION OF THE DRAWING

The above and other objects, features and advantages of the present invention will become more apparent from reading the following description of the preferred embodiments taken in connection with the accompanying drawings, wherein:

FIG. 2 is a front elevational view, with portions broken away, partly in cross section, of another embodiment of this invention;

FIG. 3 is a graph showing a thermal expansion coefficient ratio of the ZnO element to the glassy bonding material against a thermal expansion coefficient ratio of the insulator body to the glassy bonding material, in typical lightning arrestor insulators selected from experimental examples Nos. 1 to 32; and FIG. 4 is a graph showing those coefficients in the absolute values.

DETAILED DESCRIPTION OF THE INVENTION

Figure 1:
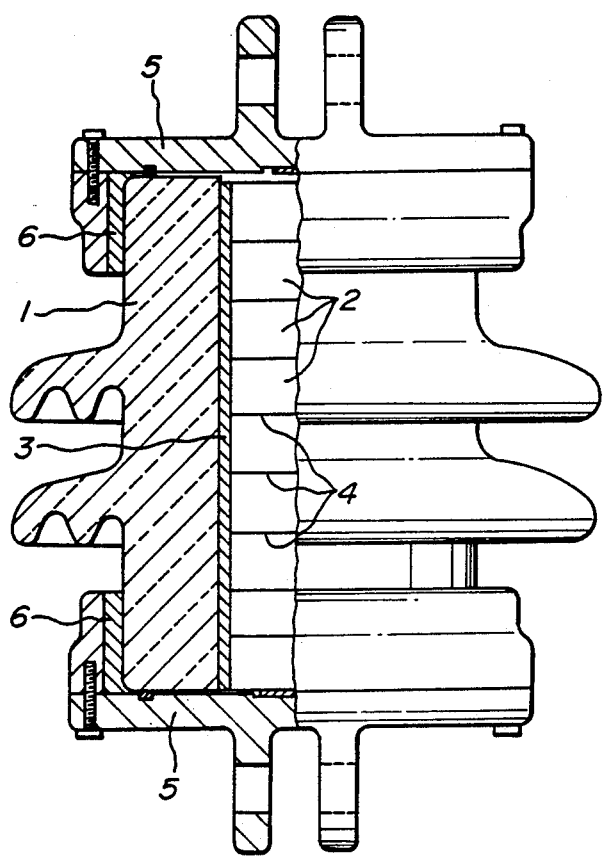
FIG. 1 is a front elevational view, partly in cross section, of an embodiment of this invention.

The present invention will be explained in more detail hereinafter.

In FIG. 1, the numeral 1 is an insulator body made of a ceramic, the numeral 2 shows ZnO elements having voltage non-linear resistant characteristics and the numeral 3 shows a glassy bonding material for integrally fixing the ZnO elements 2 in a bore of the insulator body 1. The ZnO elements 2 comprise ZnO as a main component and contain a trace amount of additives such as $Bi_2O_3$, $Sb_2O_3$, CaO, MgO or the like as well as impurities, which are stacked successively intervening a conductive paste 4 such as silver paste therebetween. Further, on the both ends of the insulator body 1, fitments 5 such as a metallic flange, cap or the like are fixed with a cement 6, and the top-most and bottom-most ends of the ZnO elements 2 are electrically connected with the inner surfaces of the fitments 5. Further, as shown in FIG. 2, the ZnO elements 2 may be fixed with the glassy bonding material 3 to the insulator body 1 of a suspending insulator. In this case, the top-most end of the ZnO elements 2 is electrically connected with the cap fitment 8 via a fitment 7 and the bottom-most end of the ZnO elements 2 is also electrically connected with a pin 10 via a fitment 9.

As was described above, in the present invention, the glassy bonding material 3 should have a thermal expansion coefficient smaller than either of thermal expansion coefficients of the ZnO element 2 and the insulator body 1. Further, in order to prevent the ZnO elements from deterioration by heat during the sealing, a glassy bonding material 3 having a melting point at 350°–520° C., preferably 400°–500° C., is employed. The reason why the thermal expansion coefficient of the glassy bonding material 3 should be smaller than either of thermal expansion coefficients of the ZnO element 2 and the insulator body 1 is, as obvious from test data given hereinafter, to minimize tensile stresses to the possible utmost extent which develop in the end portion of the glassy bonding material 3 having a lowest strength so that cracks starting from the glassy bonding material 3 may not initiate. Further, when the ratio of thermal expansion coefficient of the ZnO element 2 to the glassy bonding material 3 is represented by A and that of the insulator body 1 to the glassy bonding material 3 is represented by B, it is preferred that A and B are in the ranges of $1 < A \leq 2$ and $1 < B \leq 2.5$, respectively. It is because that, if either A or B comes outside of the above range, cracks starting from the ZnO element 2 or insulator body 1 are apt to initiate.

Furthermore, since the ZnO element will be deteriorated in its characteristics when a temperature of 500° C. or higher is applied, it is desirable that a low melting glass is used as the glassy bonding material which is able to seal at a temperature not higher than 500° C. However, the ZnO element 2 generally has a thermal expansion coefficient of about $40°-80° \times 10^{-7}/°C.$ and the insulator body 1 also has that of about $50-100 \times 10^{-7}/°C.$, while an ordinary low melting glass has a thermal expansion coefficient exceeding $100 \times 10^{-7}/°C.$, so that it is inadequate in the present invention to use the ordinary low melting glass as the glassy bonding material. Accordingly, in the present invention, a $PbO-B_2O_3$ system glass having a composition such as to separate, during solidification, low expanding ceramic crystals such as $ZrO_2.SiO_2$, $PbO.TiO_2$, β-eucryptite, cordierite and the like is used as the glassy bonding material that enables the sealing at a temperature lower than 500° C. and that has a smaller thermal expansion coefficient than the ZnO element or the insulator body. Its examples are shown in Table 1 below.

TABLE 1

|  |  | Glass A | Glass B | Glass C | Glass D | Glass O | Glass P |
|---|---|---|---|---|---|---|---|
| Composition wt. % | $SiO_2$ | 3.50 | 3.10 | 12.35 | 10.03 | 1.24 | 2.26 |
|  | $Al_2O_3$ | 0.12 | 0.57 | 10.01 | 9.08 | 0.01 | 0.25 |
|  | $Fe_2O_3$ | 0.41 | 0.42 | 0.17 | 0.01 | 0.16 | 0.22 |
|  | $TiO_2$ | 7.63 | 10.50 | 0.12 | 0.18 | 8.94 | 8.15 |
|  | CaO | 0.13 | 0.01 | 0.12 | 0.12 | 0.01 | 0.01 |
|  | MgO | 0.01 | 0.03 | 0.01 | 0.01 | 0.02 | 0.02 |
|  | $K_2O$ | 0.01 | 0.01 | 0.02 | 0.21 | 0.01 | 0.03 |
|  | $Na_2O$ | 0.03 | 0.01 | 0.04 | 0.05 | 0.02 | 0.01 |
|  | ZnO | 2.73 | 0.02 | 0.08 | 0.07 | 0.84 | 0.01 |
|  | $B_2O_3$ | 7.23 | 6.94 | 8.17 | 9.58 | 7.11 | 7.07 |
|  | PbO | 72.72 | 74.03 | 65.28 | 67.95 | 80.19 | 79.05 |
|  | $ZrO_2$ | 5.51 | 4.60 | 0.01 | 0.01 | 2.23 | 4.26 |
|  | BaO | 0.01 | 0.01 | 0.01 | 0.01 | — | — |
|  | $Li_2O$ | 0.01 | 0.01 | 3.02 | 2.00 | — | — |
|  | $Cr_2O_3$ | — | — | — | — | 0.11 | 0.15 |
|  | CoO | — | — | — | — | 0.02 | 0.03 |
| Main Crystalline Phase |  | $PbO.TiO_2$ $ZrO_2.SiO_2$ |  | β-eucryptite |  | $PbO.TiO_2$ $ZrO_2.SiO_2$ |  |
| Melting Temperature |  | 420° C. | 450° C. | 460° C. | 450° C. | 420° C. | 420° C. |
| Thermal Expansion Coefficient $\times 10^{-7}/°C.$ |  | 80 | 66 | 58 | 67 | 47 | 35 |

Experimental Example

Six blocks of ZnO element, each of 47 mm in outside diameter and 20 mm in length, which were bonded together with a conductive paste, were placed in an insulator body having an inside diameter of 51 mm, a trunk diameter of 81 mm, a shade diameter of 141 mm and a length of 120 mm. The insulator body in a heated condition at 490° C. in a electric furnace was filled up with a glassy bonding material and then cooled down. Thus, various kinds of lightning arrestor insulators shown as Nos. 1-32 in Table 2 were obtained. With respect to those lightning arrestor insulators, crack initiating conditions were observed by means of a dyeing test. Then, a cooling and heating test by soaking alternately in warm water at 60° C. and methylalcohol cooled with dry ice to −40° C., respectively for 4 hours, were repeated for 10 cycles and crack initiating conditions were observed by means of the dyeing test. The result was shown with marks O, Δ and x in Table 2. The mark O means no cracks observed, the mark Δ means cracks observed in a part of test-pieces and the mark x means cracks observed in all test-pieces.

From the above experimental examples, typical ones were selected and shown in FIG. 3 and FIG. 4. As is obvious from FIG. 3, it is understood that good results are obtained in the ranges of $1 < A \leqq 2$ and $1 < B \leqq 2.5$.

TABLE 2

| | Thermal Expansion Coefficient $\times 10^{-7}/°C.$ | | | Rate of Thermal Expansion Coefficient | | Crack Initiation | |
|---|---|---|---|---|---|---|---|
| No. | Insulator Body X | Glass Y | ZnO element Z | B X/Y | A Z/Y | After Firing | After Cooling and Heating Test |
| 1 | 47 | 47 | 47 | 1.0 | 1.0 | | X |
| 2 | 47 | 40 | 47 | 1.2 | 1.2 | | |
| 3 | 47 | 35 | 47 | 1.3 | 1.3 | | |
| 4 | 47 | 40 | 35 | 1.8 | 0.9 | X | — |
| 5 | 47 | 35 | 35 | 1.3 | 1.0 | | X |
| 6 | 58 | 58 | 58 | 1.0 | 1.0 | | X |
| 7 | 58 | 58 | 70 | 1.0 | 1.2 | | X |
| 8 | 58 | 58 | 47 | 1.0 | 0.8 | X | — |
| 9 | 58 | 53 | 47 | 1.1 | 0.9 | X | — |
| 10 | 58 | 53 | 53 | 1.1 | 1.0 | | X |
| 11 | 58 | 53 | 58 | 1.1 | 1.1 | | |
| 12 | 58 | 50 | 80 | 1.2 | 1.6 | | |
| 13 | 58 | 35 | 47 | 1.7 | 1.3 | | |
| 14 | 58 | 35 | 80 | 1.7 | 2.3 | | Δ |
| 15 | 58 | 65 | 58 | 0.9 | 0.9 | X | — |
| 16 | 72 | 72 | 72 | 1.0 | 1.0 | | X |
| 17 | 72 | 69 | 72 | 1.0 | 1.0 | | |
| 18 | 72 | 58 | 58 | 1.2 | 1.0 | | X |
| 19 | 72 | 58 | 72 | 1.2 | 1.2 | | |
| 20 | 72 | 53 | 72 | 1.4 | 1.4 | | |
| 21 | 72 | 53 | 58 | 1.4 | 1.1 | | |
| 22 | 72 | 35 | 47 | 2.1 | 1.3 | | |
| 23 | 72 | 35 | 110 | 2.1 | 3.1 | | Δ |
| 24 | 100 | 110 | 72 | 0.9 | 0.7 | X | — |
| 25 | 100 | 102 | 110 | 1.0 | 1.1 | X | — |
| 26 | 100 | 95 | 72 | 1.1 | 0.8 | X | — |
| 27 | 100 | 95 | 110 | 1.1 | 1.2 | | |
| 28 | 100 | 72 | 72 | 1.4 | 1.0 | | X |
| 29 | 100 | 72 | 110 | 1.4 | 1.5 | | |
| 30 | 100 | 35 | 110 | 2.9 | 3.1 | | Δ |
| 31 | 100 | 35 | 58 | 2.9 | 1.7 | | Δ |
| 32 | 100 | 58 | 72 | 1.7 | 1.2 | | |

As is clear from the above explanation, by selecting a glassy bonding material having a thermal expansion coefficient smaller than either of thermal expansion coefficients of the ZnO element and insulator body, crack initiations in the lightning arrestor insulator due to thermal stresses are prevented even in the case of rapid cooling or rapid heating during manufacture or voltage application, or the striking of a thunderbolt, and further an accident of fracture of the lightning arrestor insulator caused thereby is also prevented. Therefore, according to the present invention, insulators and electric equipment are not only protected from overcurrent in the case of the striking of a thunderbolt, but also can maintain stable characteristics for a long period of time, so that troublesome works for maintenance and inspection can be saved. Thus, the present invention provides a lightning arrestor insulator which has eliminated former problems and largely contributes to the development of industry.

What is claimed is:

1. A lightning arrestor insulator comprising:
    an insulator body;
    a ZnO element having voltage non-linear resistant characteristics, said element being embedded in said insulator body; and
    a glassy bonding material disposed between said insulator body and said ZnO element, said glassy bonding material integrally fixing said ZnO element to said insulator body;
    wherein said glassy bonding material has a thermal expansion coefficient which is smaller than a thermal expansion coefficient of said ZnO element and a thermal expansion coefficient of said insulator body.

2. A lightning arrestor insulator as claimed in claim 1, wherein the glassy bonding material has a melting point between 350° C. and 520° C.

3. a lightning arrestor insulator as claimed in claim 1, wherein the glassy bonding material has a melting point between 400° C. and 500° C.

4. A lightning arrestor insulator as claimed in claim 1, wherein a ratio (A) of the thermal expansion coefficient of said ZnO element to the thermal expansion coefficient of said glassy bonding material is in the range of $1 < A \leq 2$ and a ratio (B) of the thermal expansion coefficient of said insulator body to the thermal expansion coefficient of said glassy bonding material is in the range of $1 < B \leq 2.5$.

5. A lightning arrestor insulator as claimed in claim 1, wherein the glassy bonding material comprises a $PbO\text{-}B_2O_3$ glass system having a composition which separates low expanding ceramic crystals during solidification.

6. A lightning arrestor insulator as claimed in claim 5, wherein said low expanding ceramic crystals are selected from the group of crystals consisting of $ZrO_2\text{-}SiO_2$, $PbO.TiO_2$, $\beta$-eucryptite and cordierite.

7. A lightning arrestor insulator comprising:
    an insulator body;
    a ZnO element having voltage non-linear resistant characteristics, said element being embedded in said insulator body; and
    a glassy bonding material disposed between said insulator body and said ZnO element, said glassy bonding material integrally fixing said ZnO element to said insulator body;
    wherein a ratio (A) of the thermal expansion coefficient of said ZnO element to the thermal expansion coefficient of said glassy bonding material is in the range of $1 < A \leq 2$ and a ratio (B) of the thermal expansion coefficient of said insulator body to the thermal expansion coefficient of said glassy bonding material is in the range of $1 < B \leq 2.5$.

8. A lightning arrestor insulator as claimed in claim 7, wherein the glassy bonding material has a melting point between 350° C. and 520° C.

9. A lightning arrestor insulator as claimed in claim 7, wherein the glassy bonding material has a melting point between 400° C. and 500° C.

10. A lightning arrestor insulator as claimed in claim 7, wherein the glassy bonding material comprises a $PbO\text{-}B_2O_3$ glass system having a composition which separates low expanding ceramic crystals during solidification.

11. A lightning arrestor insulator as claimed in claim 7, wherein said low expanding ceramic crystals are selected from the group of crystals consisting of $ZrO_2\text{-}SiO_2$, $PbO.TiO_2$, $\beta$-eucryptite and cordierite.

12. a lightning arrestor insulator comprising:
    an insulator body;
    a ZnO element having voltage non-linear resistant characteristics, said element being embedded in said insulator body; and
    a glassy bonding material disposed between said insulator body and said ZnO element said glassy bonding material integrally fixing said ZnO element to said insulator body, said glassy bonding material comprising a $PbO\text{-}B_2O_3$ glass system having a composition which separates low expanding ceramic crystals during solidification, said composition comprising about 65-80 wt% of PbO;
    wherein a ratio (A) of the thermal expansion coefficient of said ZnO element to the thermal expansion coefficient of said glassy bonding material is in the range of $1 < A \leq 2$ and a ratio (B) of the thermal expansion coefficient of said insulator body to the thermal expansion coefficient of said glassy bonding material is in the range of $1 < B \leq 2.5$.

13. A lightning arrestor insulator as claimed in claim 12, wherein the glassy bonding material has a melting point between 350° C. and 520° C.

14. A lightning arrestor insulator as claimed in claim 12, wherein the glassy bonding material has a melting point between 400° C. and 500° C.

15. A lightning arrestor insulator as claimed in claim 12, wherein said low expanding ceramic crystals are selected from the group of crystals consisting of $ZrO_2\text{-}SiO_2$, $PbO.TiO_2$, $\beta$-eucryptite and cordierite.

* * * * *